United States Patent [19]

Katto et al.

[11] Patent Number: 4,659,789

[45] Date of Patent: Apr. 21, 1987

[54] PHENYLENE SULFIDE RESIN COMPOSITIONS

[75] Inventors: Takayuki Katto; Masahito Tada; Toshitaka Kouyama; Yo Iizuka, all of Iwaki, Japan

[73] Assignee: Kureha Kagaku Kogyo Kabushiki Kaisha, Tokyo, Japan

[21] Appl. No.: 821,916

[22] Filed: Jan. 23, 1986

[30] Foreign Application Priority Data

Jan. 31, 1985 [JP] Japan ................................ 60-17306

[51] Int. Cl.$^4$ .............................................. C08F 283/00
[52] U.S. Cl. ...................................... 525/537; 528/388
[58] Field of Search .......................... 525/537; 528/388

[56] References Cited

U.S. PATENT DOCUMENTS 3,869,434  3/1975  Campbell et al. ................. 528/388
3,966,688  6/1976  Campbell et al. ................. 528/388
3,988,286  10/1976  Edmonds, Jr. et al. ........... 525/537

Primary Examiner—Melvyn I. Marquis
Attorney, Agent, or Firm—Wenderoth, Lind & Ponack

[57] ABSTRACT

A novel phenylenesulfide resin composition comprises (I) a poly-p-phenylenesulfide, (II) a poly-m-phenylenesulfide, and (III) a phenylenesulfide block copolymer consisting essentially of a repeating unit

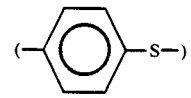

(A) and a repeating unit

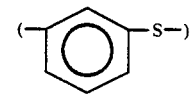

(B), wherein from 20 to 5,000 units on the average of the repeating units (A) linked together exist in the molecular chain in the form of the block component, and wherein the molar faction (X) of the repeating unit (A) is in the range of 0.10 to 0.95, the mixing ratio of the three components (I), (II) and (III) being in a specified range. The composition is characterized by compatibility between the components (I) and (II), whereby transparency, physical properties and other characteristics thereof are markedly enhanced.

13 Claims, 1 Drawing Figure

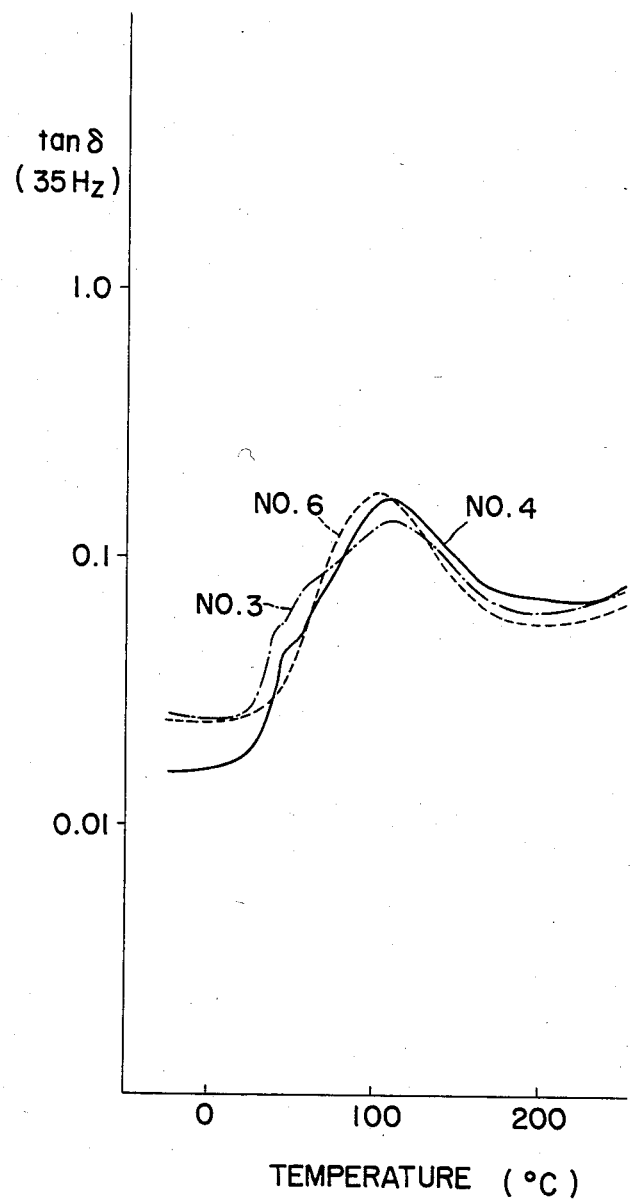

PHENYLENE SULFIDE RESIN COMPOSITIONS

BACKGROUND OF THE INVENTION

1. Field of the Invention

This invention relates to a phenylenesulfide resin composition. More specifically, this invention relates to a resin composition comprising a poly-p-phenylenesulfide, a poly-m-phenylenesulfide and a p-phenylenesulfide/m-phenylenesulfide block copolymer.

2. Description of the Prior Art

Poly-p-phenylenesulfides (hereinafter referred to as P-PPS) and poly-m-phenylenesulfides (hereinafter referred to as P-MPS) are well-known polymers. Particularly, P-PPS are being used in various fields utilizing their excellent heat resistance, chemical resistance, processability, mechanical characteristics, flame retardance, and other desirable characteristics.

On the other hand, a P-MPS has a low glass transition point and does not readily crystallize from its molten state; it behaves as an amorphous polymer under ordinary molding conditions. A P-MPS has excellent melt flowability and, when blended with a P-PPS, it improves the melt flowability of the P-PPS.

A composition consisting of a P-PPS and a P-MPS has melt flowability superior to that of a P-PPS. The composition, however, has defects in that these two polymer components lack compatibility, and clouding appears in the resulting quenched sheets, oriented films (thermally untreated or crystallized by heat-treatment), or non-stretched filaments or stretched filaments produced from the composition. When dynamic viscoelasticity is measured with a crystallized sheet sample produced from a composition consisting of the P-PPS and P-MPS, it is found that the loss tangent (tan δ)-temperature curve becomes broad, and the respective tan δ values corresponding to the P-MPS and P-PPS tend to appear separately. From this, also, it can be said that the two components have insufficient compatibility in such compositions.

SUMMARY OF THE INVENTION

We have conducted various research efforts with the aim of providing films, filaments and the like having excellent transparency and physical properties by improving compatibility between the components of a P-PPS/P-MPS mixture and have achieved the present invention.

The phenylenesulfide resin composition according to the present invention comprises:

(I) a poly-p-phenylenesulfide,
(II) a poly-m-phenylenesulfide, and
(III) a phenylenesulfide block copolymer consisting essentially of a repeating or recurring unit

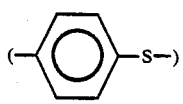

(A) and a repeating or recurring units

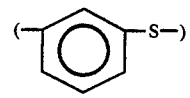

(B), wherein from 20 to 5,000 units on the average of the repeating units (A) linked together exist in the molecular chain in the form of the block component, and wherein the molar fraction (X) of the repeating unit (A) is in the range of 0.10 to 0.95, the mixing ratio of the components (I),(II) and (III) satisfying the equations.

$$\frac{I}{I + II} = 50 \text{ to } 95\% \text{ by wt.}$$

$$\frac{II}{I + II} = 50 \text{ to } 5\% \text{ by wt.}$$

$$\frac{I + II}{I + II + III} = 50 \text{ to } 95\% \text{ by wt.}$$

$$\frac{III}{I + II + III} = 50 \text{ to } 5\% \text{ by wt.}$$

A block copolymer of p-phenylenesulfide and m-phenylenesulfide (hereinafter, simply referred to as the block copolymer) has excellent compatibility with both the P-PPS and P-MPS, thus functions as compatibility promoting agent which improves compatibility between the P-PPS and P-MPS.

Therefore, the P-MPS and P-PPS in the present composition are compatibly blended to exhibit melt flowability superior to that of the P-PPS. Thus, the composition of the invention is processed more readily than P-PPS alone. When the composition is used for injection moldings or sealing materials for electronic products, a large amount of cheap inorganic materials such as glass fiber can be incorporated therein to readily improve the physical properties thereof. Moreover, since the composition of the invention containing a P-PPS as a main component sufficiently retains crystallinity owing to the presence of the P-PPS, the composition has excellent heat resistance, and the crystallinity thereof can be further improved by heat-treatment. Thus, filaments and films having excellent properties can be obtained from the composition by stretching and orienting filaments or films of an amorphous state and then subjecting them to heat-treating crystallization to increase crystallinity.

Sheets, oriented films and fibers produced from a mixture of P-PPS and P-MPS without the use of such a block copolymer exhibit clouding, which results in inferior appearance and inadequate mechanical properties such as tensile strength and tensile modulus. Transparent moldings having excellent mechanical properties which are produced from the present composition cannot be obtained from such a mixture.

BRIEF DESCRIPTION OF THE DRAWING

In the drawing, the single FIGURE is a graph showing tan δ-temperature curves No. 3, No. 4 and No. 6 of the compositions of Comparative Example 1, Example 1 and Example 3, respectively.

DETAILED DESCRIPTION OF THE INVENTION

P-PPS (Component I)

The P-PPS used in the present invention is a polymer containing, as a main structural unit, 80 mole % or more, preferably 90 mole % or more, of a para(P)-phenylenesulfide unit

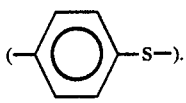

The P-PPS may contain less than 20 mole % of other copolymeric structural units in correspondence to 80 mole % or more of the p-phenylenesulfide content in the P-PPS. Such copolymer structural units include, for example, meta-phenylenesulfide unit

diphenylketonesulfide unit

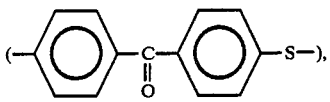

diphenylsulfonesulfide unit

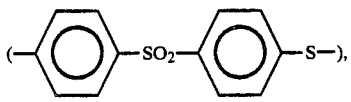

biphenylsulfide unit

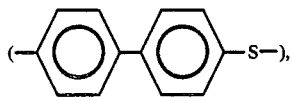

diphenylethersulfide unit

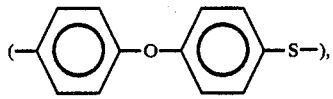

2,6-naphthalenesulfide unit

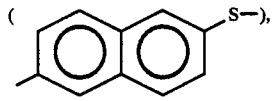

and trifunctionalsulfide unit

It is preferable that the amount of trifunctional (and tetrafunctional or higher functional) unit be not more than 1 mole %. It is thus preferable that the PPS be substantially free of a crosslinked structure. The P-PPS suitable for use in the present invention preferably has a melt viscosity in the range of 10 to 200,000 poise (measured under the conditions of a temperature of 310° C. and a shear velocity of 200 sec$^{-1}$)

As such a P-PPS, any of those synthesized according to conventional methods can be used. Such synthesis methods include a method disclosed in Japanese Patent Publication No. 3368/1970. This method comprises, for example, reacting p-dichlorobenzene with sodium sulfide in N-methylpyrrolidone (NMP) to produce a P-PPS. It is also suitable to employ a method which comprises reacting dichlorobenzene with sodium sulfide in NMP in the presence of an alkali metal salt of an organic acid such as sodium acetate to produce a high molecular P-PPS, as described in Japanese Patent Publication No. 12240/1977. Other methods can also be employed to provide a P-PPS of still higher molecular weight, such as a method wherein an inorganic salt such as lithium carbonate or calcium hydroxide is allowed to coexist during polymerization reaction in NMP and a method wherein the amount of coexisting $H_2O$ and/or polymerization temperature are controlled (Japanese Patent Application No. 126725/1984).

P-MPS (Component II)

The P-MPS to be used in the present invention is a polymer containing, as a main structural unit of the polymer, 80 mole % or more, preferably 90 mole % or more, of meta(m)-phenylenesulfide unit

Other acceptable copolymeric structural units which are contained in an amount of less than 20 mole % include, a p-phenylenesulfide unit

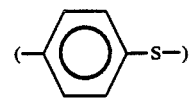

and the copolymeric structural units described above in relation to P-PPS. Also in the case of P-MPS, the amount of trifunctional unit is preferably not more than 1 mole %. It is thus preferable that the P-MPS be substantially free of a crosslinked structure. When the P-MPS is a copolymer, a random copolymer is preferred.

As such a P-MPS, any of those synthesized according to conventional polymerization methods can be used, such as the method disclosed in Japanese Patent Publication No. 3368/1970 or U.S. Pat. No. 3,869,434 specification. That is, the P-MPS can be obtained by reacting m-dichlorobenzene with sodium sulfide in NMP. When the copolymer is produced, a predetermined amount of a corresponding dihalo-aromatic compound is allowed to coexist in the reaction system. The melt viscosity of the P-MPS is much lower than that of the P-PPS, and is usually in the range of 10 to 100,000 poise (135° C., 200 sec$^{-1}$).

PPS/MPS block copolymer (Component III)

The block copolymer used in the present invention consists essentially of the repeating unit (A)

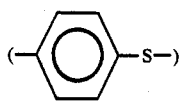

and a repeating unit (B)

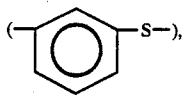

wherein from 20 to 5,000 units on an average of the repeating units (A) linked together exist in the molecular chain in the form of the block component, the molar fraction (X) of the repeating unit (A) being in the range of 0.10 to 0.95, the melt viscosity measured under the conditions of 310° C. and shear velocity of 200 sec$^{-1}$ being preferably $10^5$ poises or lower, but is preferably higher than 10 poise.

It is necessary that the molar fraction X of the repeating unit (A) which constitutes the block of the repeating unit (A) in the molecular chain of the block copolymer be in the range of 0.10 to 0.95, preferably in the range of 0.20 to 0.90, and most preferably in the range of 0.40 to 0.90. If the molar fraction X is outside of this range, the effect of the resulting block copolymer as a compatibility promoting agent is lower.

The repeating unit (B), which constitutes the block copolymer together with the p-phenylenesulfide repeating unit (A), is an aromatic repeating unit (—Ar—S—) consisting substantially of a meta(m-) phenylenesulfide repeating unit

wherein Ar denotes a residue of an aromatic compound. The aromatic repeating units (—Ar—S—) other than the m-phenylenesulfide repeating unit include one or more of the following groups:

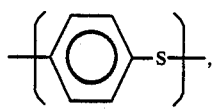

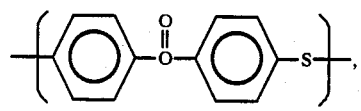

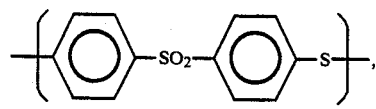

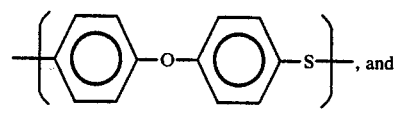

The term "substantially" herein means that the m-phenylenesulfide unit in the repeating unit (B) amounts to not less than 80 mole %, preferably 90 to 100 mole % of the unit (B). It is also preferable that the block copolymer be substantially free of a crosslinked structure. The block copolymer used in the present invention can be produced by any suitable method, as long as the method can form a block of the p-phenylenesulfide repeating unit (A) and a block of repeating unit (B) consisting essentially of m-phenylenesulfide and can link the two blocks together to give the block copolymer. For example, the method disclosed in Japanese Patent Application No. 134633/1984 can be employed. Specific examples of such methods include a method wherein one of the blocks is formed, and then formation of the other block and linking of the two blocks are carried out simultaneously, and a method wherein the two blocks are separately formed and then are linked together.

It can be said that the process for producing the block polymer according to the invention is not essentially different from a conventional method for producing a phenylenesulfide polymer except that, in the present process, formation and linking of the blocks as well as the types of phenylenesulfide repeating units are taken into account and, as necessary, the process is modified. That is, the process for producing the block polymer of the invention comprises condensation (removal of an alkali metal halide) of an alkali metal sulfide and a dihalo aromatic compound (consisting essentially of p-dihalobenzene and m-dihalobenzene) in an aprotic polar organic solvent (for example, NMP) under heating. For example, if one of the dihalobenzene (for example, p-dihalobenzene) is supplied and then the other dihalobenzene is supplied in the above condensation reaction, a block copolymer wherein a block of the latter dihalobenzene is linked to a block of the former dihalobenzene can be obtained. It is also possible to form the two blocks separately and then mix and heat these blocks, as necessary in the presence of an alkali metal sulfide and/or a dihalobenzene, to link the two blocks together.

Compositions

The phenylenesulfide resin composition according to the present invention can be obtained by mixing 5 to 50% by weight of the resulting block copolymer with 50 to 95% by weight of a mixture consisting of 50 to 95% by weight, preferably 60 to 90% by weight, of the P-PPS and 5 to 50% by weight, preferably 40 to 10% by weight, of the P-MPS. If the amount of the P-PPS in the mixture of P-PPS and P-MPS is less than 50% by weight, crystallinity due to the presence of the P-PPS cannot be maintained, heat-resistance will be impaired. On the other hand, if the amount of the P-PPS exceeds 95% by weight, the melt flowability of the resulting composition will become insufficient. If the ratio of the block copolymer to the mixture of P-PPS and P-MPS is too low, compatibility between the P-PPS and the P-MPS will become unsatisfactory, whereas if the ratio is too high, the characteristics of the mixture of P-PPS and P-MPS will be lost.

The mixing operation for producing the phenylenesulfide resin composition of the invention is carried out according to a conventional method. For example, polymer dispersions obtained by polymerization processes can be mixed in a specific ratio and than dried, or dry polymers can be blended.

The composition of the invention preferably has a melt viscosity ($\eta^*$) in the range of 10 to $10^5$ poises, more preferably in the range of 50 to $10^5$ poises (measured under the conditions of 310° C. and shear velocity of 200 sec$^{-1}$). If the melt viscosity is lower than 10 poises, a strong molded product cannot be obtained, whereas if it is higher than $10^5$ poises, molding processability will tend to deteriorate.

The fact that the P-PPS and P-MPS are miscibly blended during molding in the present invention can be seen by measuring the peaks in the loss tangent (tan $\delta$)-temperature curve of the crystalline sample in the measurement of the dynamic viscoelasticity thereof. That is, in the case where the block copolymer according to the invention is not used, the peaks of tan $\delta$ of the components tend to appear separately. On the other hand, in the case where the block copolymer is used, the peaks tend to overlap to become a single peak. Thus, the effect of the block copolymer as a compatibility promoting agent is evident.

The phenylenesulfide resin composition of the invention comprises a mixture of components (I) through (III). The term "comprises a mixture" herein means that various auxiliary materials (including resins, the details of which are described hereinafter) other than the three essential components can be contained, unless they unduly have adverse effects on the characteristics due to the three essential components. When the "auxiliary materials" are resins, the three essential components, viz. p-, m- and p/m-polyphenylene sulfides, should preferably comprise the majority of the resinous component. The composition of the invention can be used for films, fibers and other various injection moldings and extrusion moldings because of its excellent melt flowability, stretch processability and crystallinity.

Films, Yarns

The composition of the invention can be formed into films or sheets by an inflation method or a T-die method. Moreover, the films or sheets obtained by the T-die method can be processed into oriented films by means of a tenter or the like. Also, the composition can be processed into stretched filaments by extruding the composition through nozzles for spinning and then stretching the resulting filaments 2 to 20 times the original length at a temperature not lower than the second-order transition point. By weaving these non-stretched filaments or stretched filaments together with carbon fibers, glass fibers, etc. and then heating the resulting woven filaments at the melting point thereof or higher, stampable sheets can be obtained. In either case, P-MPS is miscibly blended with P-PPS. Thus, the composition can be readily processed into yarns and films, which have good transparency and excellent mechanical properties.

Extrusion or Injection Molded Products

The composition of the invention, as it is or optionally with fibrous or powdery fillers admixed herewith, is melted by heating and then extruded through a die or injected into a mold to produce a shaped article (such as a plate, pipe, bar or profile). Since P-MPS is miscibly blended with P-PPS in the present composition, the composition is superior in flowability to a conventional PPS. Thus, the composition is readily processed and can be admixed with a large amount of fillers.

Composition

The composition of the invention can be melt-mixed with powdery inorganic fillers such as mica, $TiO_2$, $SiO_2$, $Al_2O_3$, $CaCO_3$, carbon black, talc, $CaSiO_3$, and $MgCO_3$, or fibrous fillers such as glass fiber, carbon fiber, graphite fiber, and aramide fiber to produce diverse compositions. Furthermore, the composition of the invention can be blended with compatible resin materials such as polyimides, polyamides, polyetheretherketones, polysulfones, polyethersulfones, polyetherimides, polyarylenes, polyphenyleneethers, polycarbonates, polyethyleneterephthalates, polybutyleneterephthalates, polyacetals, polypropylenes, polyethylenes, ABS, polyvinyl chlorides, polymethyl methacrylates, polystyrenes, polyvinylidene fluorides, poly-tetrafluoroethylenes, and tetrafluoroethylene copolymers to obtain diverse compositions. In addition to these fillers, small amounts of coupling materials, anti-oxidants, coloring agents, etc. can also be used.

Fabricated articles

The heat-resistant films or sheets produced by forming the resin composition of the invention or a modified composition thereof are useful for electronic-electric applications such as substrates for printed circuits, magnetic tapes (coated type, vapor-deposition type or the like), insulating tapes, and floppy discs. Extruded articles (such as plates, pipes, and profiles) are useful for electronic-electric applications such as substrates for printed circuits, heat-insulating tubes for integrated wiring as well as for chemical-industrial applications such as various corrosion-resistant, heat-resistant pipings. A wire coated with the composition of the invention is useful as a heat-resistant, corrosion-resistant wire. Injection moldings are useful as an IC sealing material for substrates for printed circuits, connectors, parts of a microwave device and the like in the field of electronic and electric industries and for large-scale pumps, large-scale valves, sealing materials, lining materials and the like in the field of chemical industries.

EXPERIMENTAL EXAMPLES

Examples 1, 2, and 3 and Comparative Examples 1, 2, and 3

Synthesis Example (1)

Synthesis of poly-p-phenylenesulfide

A 20-liter autoclave was charged with 9 kg of NMP and 3.392 kg of $Na_2S.5H_2O$ (20 mols of $Na_2S$) containing 46.02% by weight of $Na_2S$, and the mixture was gradually heated to 202° C. in an atmosphere of $N_2$ to distill off 1,366 g of water, 834 g of NMP and 0.62 mol of $H_2S$. In this procedure, the water in the system amounted to about 1.33 mol per mol of $Na_2S$. After allowing the system to cool to 130° C., 2.878 kg of p-dichlorobenzene (PDCB) (molar ratio of PDCB/Na$_2$S=1.01/1.00) and 1.5 kg of NMP were added thereto, and polymerization was conducted at 210° C. for 10 hours. Then, 932 g of water was introduced into the polymerization slurry under pressure with N$_2$ (total amount of water amounted to 4 mol per mol of Na$_2$S), and the resulting slurry was heated to 260° C. and subjected to polymerization for 10 hours. After cooling, pearl-like P-PPS was sieved from NMP, PPS oligomers, etc., washed repeatedly with deionized water, and dried at 100° C. for 3 hours to produce P-PPS. The yield of the polymer was 86%, and the melt viscosity thereof was 6,000 poises under the conditions of 310° C./200 sec$^{-1}$. The glass transition point (Tg) of this polymer was 87° C. A sample of the polymer in non-crystalline state showed a crystallization point (Tc$_1$) of 135° C. upon heating, wheras a sample of the polymer in a molten state showed a crystallization point (Tc$_2$) of 198° C. upon cooling. The melting point of the crystal (Tm) was 280° C. Values of Tg, Tc$_1$, Tc$_2$ and Tm were measured on a sample which had been melted and then quenched by means of a differential scanning calorimeter heated or cooled at the rate of 10° C./min. in nitrogen. The Tg corresponds to the temperature at the starting of absorption; Tc$_1$ and Tc$_2$ correspond to peak crystallization temperatures; and Tm corresponds to a peak melting temperature.

Synthesis Example (2): Synthesis of Poly-m-phenylenesulfide

A 10-liter autoclave was charged with 5 kg of NMP and 1.885 kg of Na$_2$S.5H$_2$O (11 mol of Na$_2$S) containing 45.54% by weight of Na$_2$S, and gradually heated to 200° C. in an atmosphere of N$_2$ to distill off 831 g of water, 715 g of NMP and 0.3 mol of H$_2$S. In this procedure, the water in the system amounted to about 0.96 mol per mol of Na$_2$S. After allowing the system to cool to 130° C., 1.589 kg of m-dichlorobenzene(m-DCB) (molar ratio of m-DCB/Na$_2$S=1.01/1.0), 142.6 g of water and 1.067 kg of NMP were added thereto (water amounted to 1.7 mol per mol of Na$_2$S), and polymerization was carried out at 220° C. for 10 hours. Then, to the polymerization slurry was added 540 g of water (total amount of water corresponded to 4.5 mol per mol of Na$_2$S), and the slurry was heated to 250° C. and subjected to polymerization for 10 hours. The resulting polymer was repeatedly washed with water and dried at 70° C. for 20 hours. The yield of the polymer was 60%. The quantity of terminal Cl was determined by means of fluorescent X-ray, and the average polymerization degree was calculated to be 110 on the assumption that one end of the polymer chain was Cl. The melt viscosity was 200 poises (135° C., 200 sec$^{-1}$).

Synthesis Example (3): Phenylenesulfide block copolymer [A] A 10-liter autoclave was charged with 4 kg of NMP and 1.870 kg of Na$_2$S.5H$_2$O (11 mol of Na$_2$S) containing 45.9% by weight of Na$_2$S and then gradually heated to 200° C. in an atmosphere of N$_2$ to distill off 762 g of water, 742 g of NMP and 9 g of H$_2$S. The amount of H$_2$O in the system corresponded to 1.24 mol per mol of Na$_2$S. After the reaction system was cooled to 130° C., 1,547 g of m-DCB (the molar ratio of m-DCB/Na$_2$S was 0.98/1.00), 2,110 g of NMP and 50 g of H$_2$O (H$_2$O amounted to 1.5 mol per mol of Na$_2$S) were added thereto. Then polymerization was carried out at 220° C. for 2 hours and thereafter at 230° C. for 8 hours. The average polymerization degree was 80, which was calculated from the amount of terminal Cl in the polymer chain determined with respect to a small amount of sampled polymer. The melt viscosity was 70 poises (135° C., 200 sec$^{-1}$).

[B] A 20-liter autoclave was charged with 7.5 kg of NMP and 3.060 kg (18 mol) of Na$_2$S.5H$_2$O containing 45.9% by weight of Na$_2$S and was gradually heated to 200° C. in an atmosphere of N$_2$ to distill off 1.268 kg of H$_2$O, 1.354 kg of NMP and 17.3 g of H$_2$S. The amount of H$_2$O in the system was 1.17 mol per mol of Na$_2$S. After being cooled to 140° C., the reaction mixture was supplied with 2.636 kg of P-DCB (the molar ratio PDCB/Na$_2$S was 1.025), 2.5 kg of NMP and 103.3 g of H$_2$O (H$_2$O amounted to 1.5 mol per mol of Na$_2$S), as well as 2,315 g of the P-MPS slurry (containing 3.087 mol of P-MPS polymer) which had been obtained in [A] above, and then was subjected to polymerization at 220° C. for 10 hours. Additional H$_2$O (1.296 kg) was introduced into the autoclave under pressure (the total water content amounted to 5 mol per mol of Na$_2$S), and polymerization was carried out at 260° C. for 5 hours.

Post-treatment was conducted as in Synthesis Example 1 to produce a phenylenesulfide block copolymer having a melt viscosity of 3,500 poises (310° C./200 sec$^{-1}$) in a yield of 85%. The ratio PPS/MPS according to infrared absorption spectroscopy was 85/15. The average polymerization degree of p-phenylenesulfide repeating unit calculated from the average polymerization degree of the m-phenylenesulfide repeating unit 80 and the molar ratio (85/15) was about 450.

The block copolymer thus obtained was a crystalline polymer having the following values: Tg=77° C., Tc$_1$=130° C., Tm=273° C., and Tc$_2$=188° C.

Preparation of compositions and Tests on physical properties

The P-PPS (polymer [I]), the P-MPS (polymer [II]) and the phenylenesulfide block copolymer (polymer [III]) which had been obtained in Synthesis Examples (1), (2) and (3) were powder-blended in specific ratios. The resulting mixtures were melt-extruded twice by means of a small extruder into pellets. Each of the resulting compositions was tested as to melt viscosity, transition points and dynamic viscoelastic behavior. The resulting transition points and melt viscosities are shown in Table 1.

TABLE I

| Composition No. | Example No. | Material | Mixing ratio (by weight) | Tg | Tc$_1$ | Tm | Tc$_2$ | η*(poise) 310° C./200 sec$^{-1}$ |
|---|---|---|---|---|---|---|---|---|
| 1 | Comparative Example 1 | PPPS [I] | — | 87 | 135 | 280 | 198 | 6000 |
| 2 | Comparative Example 2 | block copolymer [III] | — | 77 | 130 | 273 | 188 | 3500 |
| 3 | Comparative Example 3 | [I] + [II] | 85/15 | 59;73 | 123 | 282 | 198 | 2200 |
| 4 | Example 1 | [I] + [II] + [III] | 76.5/13.5/10 | 71 | 129 | 279 | 201 | 2300 |
| 5 | Example 2 | [I] + [II] + [III] | 68/12/20 | 71 | 129 | 277 | 197 | 2400 |

TABLE I-continued

| Composition No. | Example No. | Material | Mixing ratio (by weight) | Transition point | | | | η*(poise) 310° C./200 sec$^{-1}$ |
|---|---|---|---|---|---|---|---|---|
| | | | | Tg | Tc$_1$ | Tm | Tc$_2$ | |
| 6 | Example 3 | [I] + [II] + [III] | 51/9/40 | 72 | 129 | 278 | 196 | 2600 |

*The weight ratio of P-PPS unit to P-MPS unit in Compositions 2 through 6 is 85/15.

It can be seen from the results in Table 1 that the compositions of Examples 1, 2, and 3 have high crystalline melting points, and that the P-PPS and P-MPS are miscibly blended in the compositions of Examples 1, 2, and 3 in view of the single Tg in contrast to the two Tg values in the composition of Comparative Example 3.

The dynamic viscoelastic behaviors were as follows. The results of dynamic viscoelastic measurement on Sample Nos. 3, 4 and 6 are shown in FIG. 1. If the amount of the block copolymer added to a composition is increased, a tan δ curve as a function of temperature (tan δ-temperature curve) will tend to overlap, which shows that compatibility is improved. Measurement was carried out on sheets of 0.2 mm thickness which had been prepared through melt-pressing and quenching and subjected to a heat-treatment under the condition of 260° C./30 min. These sheet samples were measured by "Rheovibron Model DDV-II-EA" manufactured by Toyo Baldwin at a frequency of 35 Hz.

Fibers

From the compositions obtained in Examples 1, 2, and 3, fibers were produced in the following manner.

Non-stretched monofilaments were prepared from each of the pellets of the Compositions No. 4, No. 5 and No. 6 as well as Composition No. 3 of Comparative Example 3 by means of a melt tension tester. The monofilaments were drawn through a nozzle of 0.5 mm in diameter and 3 mm in length at 310° C. at an average rate of 12 mm/min. (spin stretch ratio $\overline{R}_1=7$). The non-stretched monofilaments thus obtained were immersed in an oil bath at 100° C. and stretched 4 times in length using a manual stretcher. The resulting stretched monofilaments were heat-treated at 200° C. for 2 hours at constant length. The strength, elongation and elasticity modulus of each of the resulting heat-treated yarns and untreated yarns are shown in Table 2. The physical properties of the yarns were measured by Tensilon (manufactured by Toyo Baldwin).

Sheet

Sheets of 200-μ thickness were produced from the pellets of the compositions of Example 3 and Comparative Example 3 by melt-pressing at 320° C. and subsequent quenching. Clouding was observed in the sheet of Comparative Example 3, whereas the sheet of Example 3 was transparent.

These sheets were heat-treated at 240° C. for 4 hours to crystallize the polymers. The physical properties of the sheets are shown in Table 3.

TABLE 3

| | Composition No. | Tensile strength (kg/mm$^2$) | Elongation (%) | Tensile modulus (kg/mm$^2$) |
|---|---|---|---|---|
| Comparative Example 3 | 3 | 6.7 | 5 | 23.0 |
| Example 3 | 6 | 8.6 | 6 | 26.0 |

What is claimed is:

1. A phenylenesulfide resin composition which comprises:
   (I) a poly-p-phenylenesulfide,
   (II) a poly-m-phenylenesulfide, and
   (III) a phenylenesulfide block copolymer consisting essentially of a repeating unit

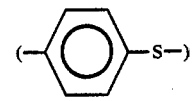

(A) and a repeating unit

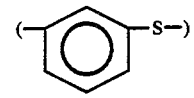

TABLE 2

| Composition No. | Example No. | Ratio of PPPS/PMPS/block copolymer | Heat-untreated yarn | | | Heat-treated yarn | | |
|---|---|---|---|---|---|---|---|---|
| | | | tensile strength (kg/mm$^2$) | elongation (%) | tensile modulus of elasticity (kg/mm$^2$) | tensile strength (kg/mm$^2$) | elongation (%) | tensile modulus (kg/mm$^2$) |
| 3 | Comparative Example-3 | 85/15/0 | 34 | 38 | 450 | 27 | 38 | 490 |
| 4 | Example-1 | 76.5/13.5/10 | 40 | 35 | 520 | 47 | 42 | 600 |
| 5 | Example-2 | 68/12/20 | 40 | 41 | 460 | 61 | 48 | 590 |
| 6 | Example-3 | 51/9/40 | 37 | 35 | 475 | 55 | 44 | 600 | conditions for heat treatment: at constant length 200° C. × 2 hr
measurement of physical properties: tensile speed 25 mm/min
temperature 23° C.

It can be seen from the results in Table 2 that both the untreated yarns and heat-treated yarns produced from the compositions of the invention are superior to the yarns produced from a mere mixture of P-PPS and P-MPS in tensile strength and tensile modulus and have excellent transparency.

(B), wherein from 20 to 5,000 units on the average of the repeating units (A) linked together exist in the molecular chain in the form of the block component and wherein the molar fraction (X) of the repeating unit (A) is in the range of 0.10 to 0.95;

the mixing ratio of the components (I), (II) and (III) satisfying the equations:

$$\frac{I}{I + II} = 50 \text{ to } 95\% \text{ by weight}$$

$$\frac{II}{I + II} = 50 \text{ to } 5\% \text{ by weight}$$

$$\frac{I + II}{I + II + III} = 50 \text{ to } 95\% \text{ by weight}$$

$$\frac{III}{I + II + III} = 50 \text{ to } 5\% \text{ by weight}$$

2. The phenylenesulfide resin composition as claimed in claim 1 in which the poly-p-phenylenesulfide (I) comprises a unit of p-phenylenesulfide in a quantity of at least 80 mole percent of the poly-p-phenylenesulfide.

3. The phenylenesulfide resin composition as claimed in claim 2 in which the quantity of a unit of p-phenylenesulfide is at least 90 mole percent of the poly-p-phenylenesulfide.

4. The phenylenesulfide resin composition as claimed in claim 1 in which the poly-m-phenylenesulfide (II) comprises a unit of m-phenylenesulfide in a quantity of at least 80 mole percent of the poly-m-phenylenesulfide.

5. The phenylenesulfide resin composition as claimed in claim 4 in which the quantity of a unit of m-phenylenesulfide is at least 90 mole percent of the poly-m-phenylenesulfide.

6. The phenylenesulfide resin composition as claimed in claim 1 in which each of the phenylenesulfide polymers (I), (II) and (III) are substantially free of a cross-linked structure.

7. The phenylenesulfide resin composition as claimed in claim 1 in which the poly-p-phenylenesulfide (I) has a melt viscosity of 10 to 200,000 poises measured under the condition of a temperature of 310° C. and a shear velocity of 200 $sec^{-1}$.

8. The phenylenesulfide resin composition as claimed in claim 1 in which the poly-m-phenylenesulfide (II) has a melt viscosity of 1 to 100,000 poises measured under the conditions of a temperature of 135° C. and a shear velocity of 200 $sec^{-1}$.

9. The phenylenesulfide resin composition as claimed in claim 1 in which the block copolymer (III) has a melt viscosity of 10 to $10^5$ poises measured under the conditions of a temperature of 310° C. and a shear velocity of 200 $sec^{-1}$.

10. The phenylenesulfide resin composition as claimed in claim 1 in which the molar fraction X is in the range of 0.10 to 0.95.

11. The phenylenesulfide resin composition as claimed in claim 10 in which the molar fraction (X) is in the range of 0.40 to 0.90.

12. The phenylenesulfide resin composition as claimed in claim 1 in which the composition has a melt viscosity in the range of 10 to $10^5$ poises.

13. The phenylenesulfide resin composition as claimed in claim 12 in which the melt viscosity is in the range of 50 to $10^5$ poises.

* * * * *